United States Patent
Shibata et al.

(10) Patent No.: US 10,220,755 B2
(45) Date of Patent: Mar. 5, 2019

(54) AIR PRESSURE CONTROL DEVICE OF VEHICLE SEAT AND AIR PRESSURE CONTROL METHOD OF VEHICLE SEAT

(71) Applicant: AISIN SEIKI KABUSHIKI KAISHA, Kariya-shi (JP)

(72) Inventors: Akiyoshi Shibata, Nagoya (JP); Yuki Fujii, Obu (JP); Hiroyuki Oda, Hamamatsu (JP); Shunsuke Hayakawa, Obu (JP); Shunsuke Tanaka, Nisshin (JP); Shinichiro Komaki, Toyota (JP); Kenji Hashimoto, Nisshin (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/626,740

(22) Filed: Jun. 19, 2017

(65) Prior Publication Data

US 2017/0368969 A1    Dec. 28, 2017

(30) Foreign Application Priority Data

Jun. 23, 2016 (JP) ................. 2016-124972

(51) Int. Cl.
*A47C 3/00* (2006.01)
*B60N 2/90* (2018.01)
*B60N 2/66* (2006.01)

(52) U.S. Cl.
CPC ............. *B60N 2/914* (2018.02); *B60N 2/665* (2015.04)

(58) Field of Classification Search
CPC ....... A47C 4/54; A47C 27/084; A47C 27/083; A47C 27/082; A47C 27/10; A47C 27/18; B60N 2/665

USPC ................ 297/284.3, 284.1, 284.6
See application file for complete search history.

(56) References Cited

U.S. PATENT DOCUMENTS

| | | | | |
|---|---|---|---|---|
| 4,491,364 A | * | 1/1985 | Hattori ..................... | B60N 2/66 297/284.6 |
| 4,634,179 A | * | 1/1987 | Hashimoto ............ | A47C 7/467 297/284.3 |
| 5,170,364 A | * | 12/1992 | Gross ...................... | A47C 4/54 702/139 |

(Continued)

FOREIGN PATENT DOCUMENTS

| JP | 3-32943 | 2/1991 |
|---|---|---|
| JP | 2014-213739 | 11/2014 |

OTHER PUBLICATIONS

U.S. Appl. No. 15/467,232, filed Mar. 23, 2017, Shibata, et al.

*Primary Examiner* — Chi Q Nguyen
(74) *Attorney, Agent, or Firm* — Oblon, McClelland, Maier & Neustadt, L.L.P.

(57) ABSTRACT

An air pressure control device of a vehicle seat includes: a bulging shape forming unit configured to form a bulging shape on a seat surface by expanding air bags configured to be provided inside a seat; a bulging shape moving unit configured to move a position of the bulging shape formed on the seat surface by each corresponding air bag by sequentially expanding and contracting a plurality of air bags aligned in a direction along the seat surface in an arrangement direction of the air bags; and a pumping capacity adjusting unit configured to increase a pumping capacity of an air pump that pumps air into each air bag as a protrusion amount of the corresponding bulging shape increases when a formation position of the bulging shape is moved.

7 Claims, 6 Drawing Sheets

(56) References Cited

U.S. PATENT DOCUMENTS

| | | | | |
|---|---|---|---|---|
| 5,658,050 | A * | 8/1997 | Lorbiecki | B60N 2/4415 |
| | | | | 297/452.41 |
| 6,203,105 | B1 * | 3/2001 | Rhodes, Jr. | A47C 4/54 |
| | | | | 297/284.6 |
| 6,273,810 | B1 * | 8/2001 | Rhodes, Jr. | A47C 4/54 |
| | | | | 454/120 |
| 7,093,898 | B2 * | 8/2006 | Ladron De Guevara | |
| | | | | A47C 4/54 |
| | | | | 297/284.6 |
| 7,517,024 | B2 * | 4/2009 | Cvek | A47C 7/282 |
| | | | | 297/218.1 |
| 9,579,998 | B2 * | 2/2017 | Hall | B60N 2/448 |
| 9,802,521 | B2 * | 10/2017 | Ferretti | B60N 2/72 |
| 9,845,035 | B2 * | 12/2017 | Hosbach | B60N 2/665 |
| 2007/0273188 | A1 * | 11/2007 | Morrison | A47C 4/54 |
| | | | | 297/284.3 |
| 2014/0327280 | A1 * | 11/2014 | Honnna | B62J 1/007 |
| | | | | 297/195.12 |

* cited by examiner

WHEN LOWER WAIST
PORTION BULGES

WHEN MIDDLE WAIST
PORTION BULGES

WHEN UPPER WAIST
PORTION BULGES

AIR PRESSURE CONTROL DEVICE OF VEHICLE SEAT AND AIR PRESSURE CONTROL METHOD OF VEHICLE SEAT

CROSS REFERENCE TO RELATED APPLICATIONS

This application is based on and claims priority under 35 U.S.C. § 119 to Japanese Patent Application 2016-124972, filed on Jun. 23, 2016, the entire contents of which are incorporated herein by reference.

TECHNICAL FIELD

This disclosure relates to an air pressure control device of a vehicle seat and an air pressure control method of a vehicle seat.

BACKGROUND DISCUSSION

In the related art, there has been a vehicle seat device in which air bags (bladders) provided inside a seat are expanded, thereby bulging a seat surface so that the support shape of the seat can be changed. For example, a seat device disclosed in JP 03-032943A (Reference 1) includes a plurality of air bags provided inside a seat back, at a position on which the waist portion (lumbar) of an occupant seated on the seat is abutted. Specifically, the air bags are arranged to be aligned in the vertical direction so as to follow the backrest face of the seat back. By sequentially expanding and contracting the air bags along the arrangement direction, it is possible to vertically move the bulging shape formed by each corresponding air bag on the seat surface, that is, the position of a lumbar support shape.

However, in the case of the air pressure type seat device as described above, the larger the amount of protrusion of the bulging shape formed by the expanded air bag on the seat surface, the larger the amount of air pumped into the air bag. That is, when the air bag in a contracted state is expanded, the time until the bulging shape formed on the seat surface reaches the required amount of protrusion becomes long. Accordingly, when the formation position of the bulging shape is moved by sequentially expanding and contracting the air bags as described above, there is a problem in that the time required for the movement of the corresponding bulging shape varies depending on the amount of protrusion of the bulging shape. In this respect, there is still room for improvement.

Thus, a need exists for an air pressure control device of a vehicle seat and an air pressure control method of the vehicle seat which are not susceptible to the drawback mentioned above.

SUMMARY

It is preferable that an air pressure control device of a vehicle seat according to an aspect of this disclosure includes: a bulging shape forming unit configured to form a bulging shape on a seat surface by expanding air bags configured to be provided inside a seat; a bulging shape moving unit configured to move a position of the bulging shape formed on the seat surface by each corresponding air bag by sequentially expanding and contracting a plurality of air bags aligned in a direction along the seat surface in an arrangement direction of the air bags; and a pumping capacity adjusting unit configured to increase a pumping capacity of an air pump that pumps air into each air bag as a protrusion amount of the corresponding bulging shape increases when a formation position of the bulging shape is moved.

It is preferable that a method of controlling an air pressure of a vehicle seat according to another aspect of this disclosure includes: forming a bulging shape on a seat surface by expanding air bags configured to be provided inside a seat; moving a position of the bulging shape formed on the seat surface by each corresponding air bag by sequentially expanding and contracting a plurality of air bags aligned in a direction along the seat surface, in an arrangement direction of the air bags; and increasing a pumping capacity of an air pump that pumps air into each air bag as a protrusion amount of the corresponding bulging shape increases when a formation position of the bulging shape is moved.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, descriptions will be made on a seat device having an air pressure type seat support function and an air pressure control thereof according to an embodiment with reference to drawings.

Figure 1:
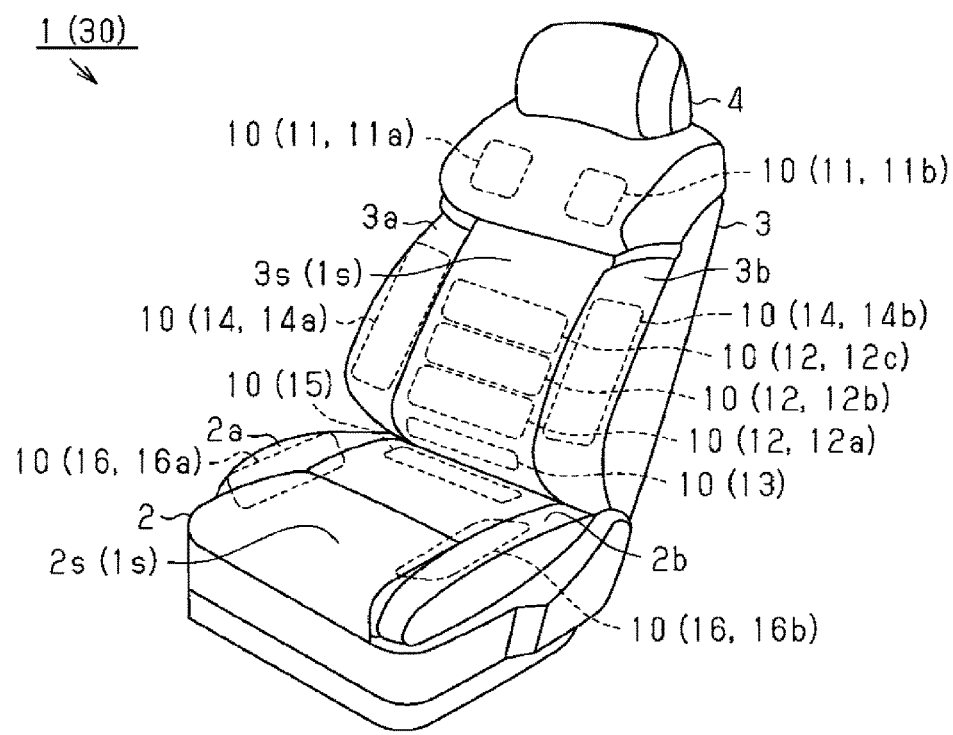
FIG. 1 is a perspective view illustrating a vehicle seat inside which air bags are provided.

As illustrated in FIG. 1, a seat 1 for a vehicle includes a seat cushion 2, and a seat back 3 provided at the rear end portion of the seat cushion 2. A headrest 4 is provided at the upper end of the seat back 3.

In the seat 1 according to the embodiment, the seat back 3 has a shape in which both side portions 3a and 3b bulge forward. Also, the seat cushion 2 has a shape in which both side portions 2a and 2b bulge upward. Accordingly, in the seat 1 according to the embodiment, it is possible to secure a good seating posture of an occupant and to maintain the seating posture.

In the seat 1, a plurality of air bags 10 (11 to 16) are provided inside the seat cushion 2 and the seat back 3. Specifically, in the seat 1 according to the embodiment, separate air bags 11 (11a and 11b), 12 (12a to 12c), 13, and 14 (14a and 14b) are provided at positions corresponding to a shoulder portion (shoulder), a waist portion (lumbar), and a lower end portion (back pelvis) of a backrest face 3s, and the both side portions 3a and 3b, respectively, inside the seat back 3. In the seat cushion 2 as well, separate air bags 15 and 16 (16a and 16b) are provided inside the rear end portion (cushion pelvis) on a seating surface 2s and the inside the both side portions 2a and 2b, respectively.

Figures 2A, 2B:
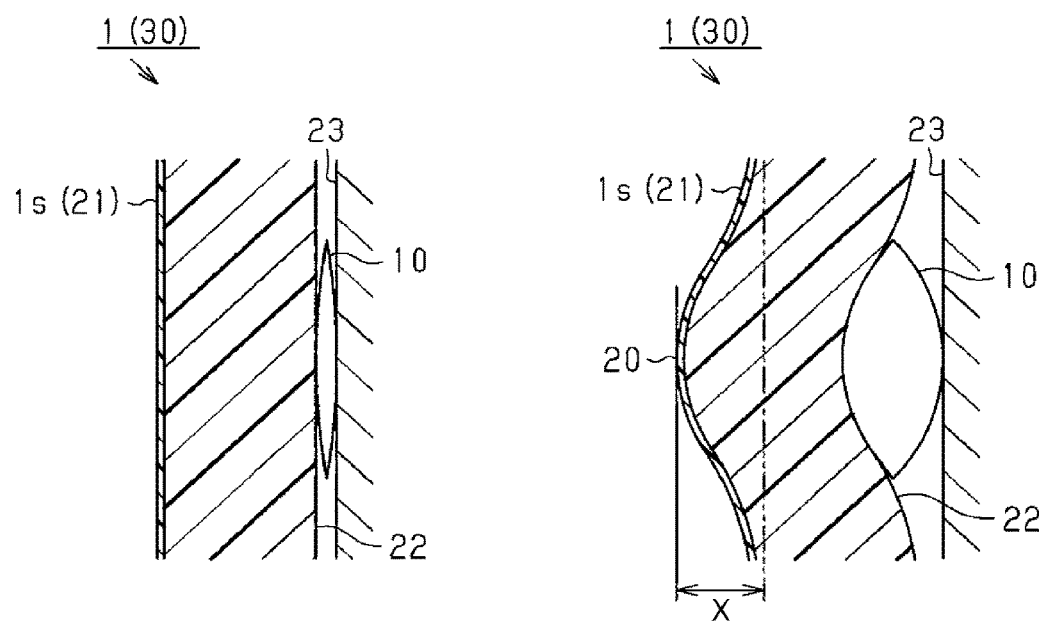
FIGS. 2A and 2B are explanatory views each illustrating an air bag configured to be provided inside a seat, and a bulging portion formed on a seat surface when the air bag is expanded.

As illustrated in FIGS. 2A and 2B, in the seat 1 according to the embodiment, each air bag 10 is provided between a cushion pad 22 located inside a seat skin 21 and a structure 23 of the seat 1. Accordingly, the air bag 10 is configured to press the seat skin 21 integrally with the cushion pad 22 from the inside.

That is, as illustrated in FIG. 2B, while each air bag 10 provided inside the seat 1 is expanded, a bulging shape 20 is formed on a seat surface 1s. A protrusion amount X of the bulging shape 20 varies depending on the expanded/contracted state of each air bag 10. That is, for example, the front-rear position of the lumbar support shape formed on the backrest face 3s of the seat back 3 is defined by the protrusion amount X of the bulging shape 20. For convenience, in FIG. 2B, the vertex position of the bulging shape 20 formed on the seat surface 1s is indicated as the formation position of the corresponding bulging shape 20. Accordingly, in the seat 1 according to the embodiment, a seat device 30 capable of changing the seat support shape is formed.

Figure 3:
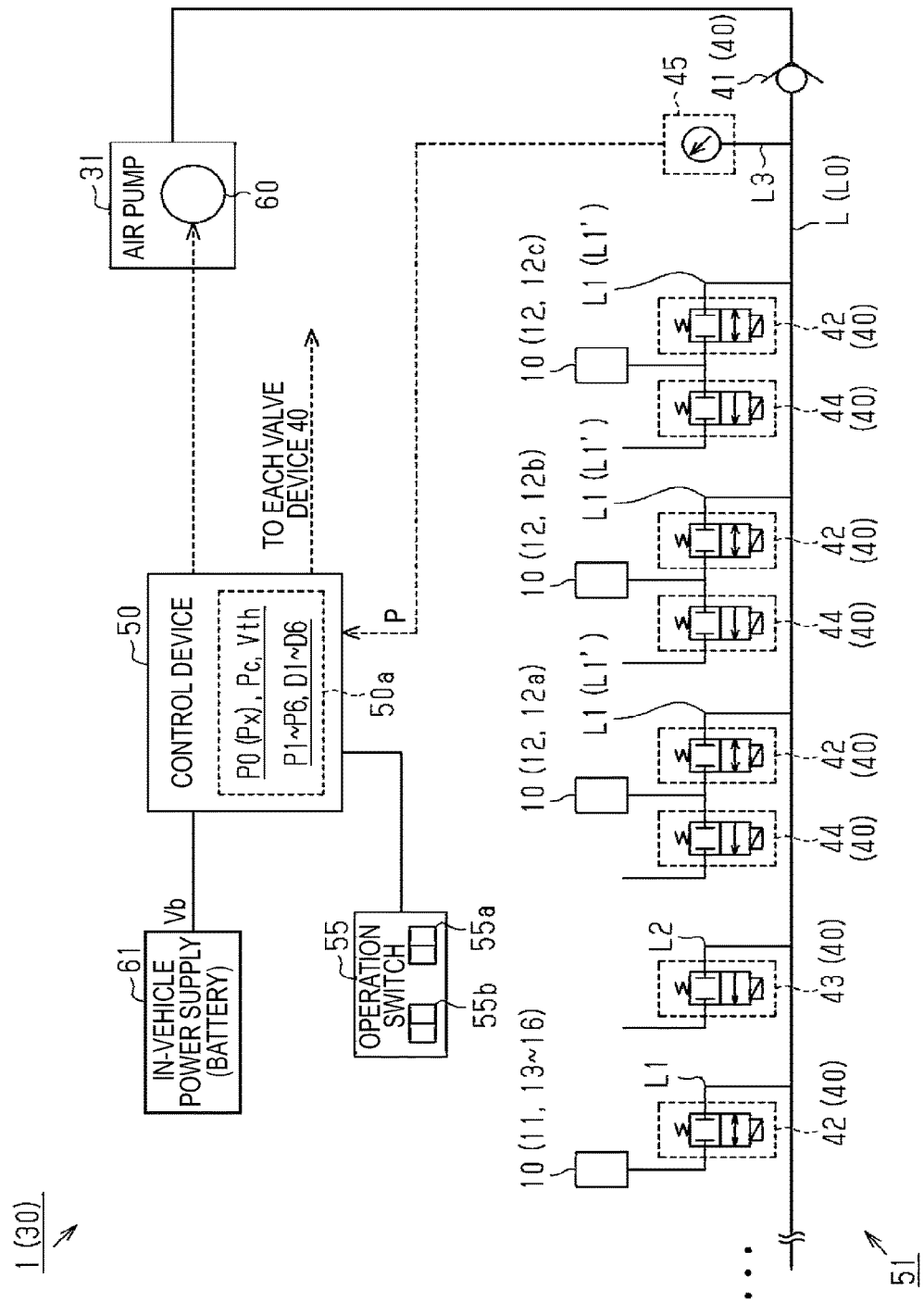
FIG. 3 is a schematic view illustrating a configuration of a seat device.

More specifically, as illustrated in FIG. 3, the seat device 30 according to the embodiment includes an air pump 31 that pumps air to each of the air bags 10. A plurality of valve devices 40 (41 to 44) are provided in an air flow path L communicating with each of the air bags 10. The seat device 30 according to the embodiment includes a control device 50 that controls the operations of the air pump 31 and the valve devices 40. Accordingly, in the embodiment, an intake/exhaust device 51 is formed to pump (fill) air into each of the air bags 10 and to discharge the air filled in each of the air bags 10.

Specifically, in the flow path L according to the embodiment, a check valve 41 is provided so as to prevent a backward flow of air pumped from the air pump 31. The flow path L according to the embodiment includes a plurality of branch lines L1 branching off from a main line L0 of the flow path L where the check valve 41 is provided, at the downstream side in relation to the check valve 41 when the air pump 31 side is defined as the upstream. Each of the air bags 10 according to the embodiment is independently provided in each of the branch lines L1, one by one.

The seat device 30 according to the embodiment includes a plurality of intake valves 42 each of which is provided at an upstream position of each of the air bags 10 in each of the branch lines L1. In the same manner as in the branch lines L1, the flow path L according to the embodiment includes branch lines L2 and L3 branching off from the main line L0 at a downstream position in relation to the check valve 41. The seat device 30 according to the embodiment includes an exhaust valve 43 provided in the branch line L2 and a pressure sensor 45 provided in the branch line L3.

That is, in order to expand each air bag 10, the control device 50 according to the embodiment drives the air pump 31 in a state where the intake valve 42 provided in the branch line L1 communicating with an air bag 10 to be expanded is opened and the exhaust valve 43 provided in the branch line L2 is closed. Here, the pressure within the flow path L at the downstream side of the check valve 41, including the branch line L3 where the pressure sensor 45 is provided, becomes equal to an internal pressure P of the air bag 10 to be expanded. Accordingly, while the internal pressure P of an air bag 10 to be expanded is monitored using the pressure sensor 45, the control device 50 according to the embodiment is configured to pump air into the corresponding air bag 10.

Specifically, the control device 50 according to the embodiment holds a target value (internal pressure target value P0) of the internal pressure P of each air bag 10 in a storage area 50a. In the seat device 30 according to the embodiment, the internal pressure target value P0 of each air bag 10 is updated while the occupant sets an optimum support shape using an operation switch 55 provided in the seat 1 (or its vicinity) (support shape adjustment operation). The control device 50 according to the embodiment is configured to control the operations of the air pump 31 and the valve devices 40 that constitute the intake/exhaust device 51 so that the internal pressure P of each air bag 10 to be detected coincides with the internal pressure target value P0.

In order to contract each air bag 10, the control device 50 according to the embodiment opens the exhaust valve 43 provided in the branch line L2 in a state where the intake valve 42 corresponding to the target air bag 10 is opened. The control device 50 is configured to detect the internal pressure P of the contracted air bag 10 in a state where the exhaust valve 43 is closed after the internal air is discharged.

Figure 4A:
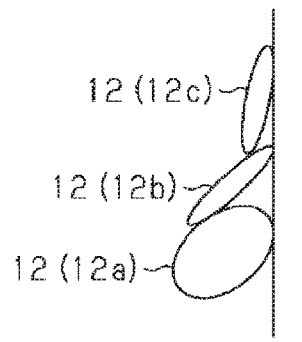
FIGS. 4A to 4C are explanatory views each illustrating air bags for lumbar support aligned in a vertical direction along a backrest face of a seat back.
Figure 4B:
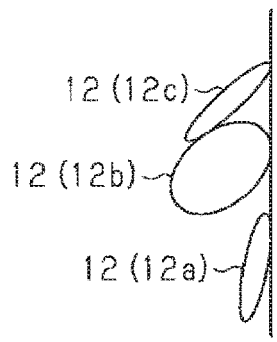
Figure 4C:
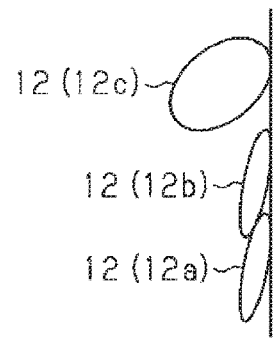

Here, as illustrated in FIGS. 4A to 4C, the seat device 30 according to the embodiment has a configuration in which the air bags 12 (12a to 12c) for lumbar support, which are provided inside the seat back 3 at locations corresponding to the waist portion of the backrest face 3s (see FIG. 1), are separately expanded and contracted. By changing the expanded and contracted state of each air bag 12, the position of the bulging shape 20 formed on the waist portion of the backrest face 3s constituting the seat surface 1s is moved. As a result, the lumbar support shape may be changed.

Specifically, as illustrated in FIG. 4A, among the three air bags 12 for lumbar support, when the lower waist portion air bag 12a located at the lower side is expanded and the two air bags 12 (12b and 12c) located at the upper side are contracted, a lumbar support shape is formed with a bulging lower portion in which the lower waist portion air bag 12a is located. As illustrated in FIG. 4B, when the middle waist portion air bag 12b located in the middle is expanded and the two air bags 12 (12a and 12c) located at the upper and lower sides are contracted, a lumbar support shape is formed with a bulging middle portion in which the middle waist portion air bag 12b is located. As illustrated in FIG. 4C, when the upper waist portion air bag 12c located at the upper side is expanded and the two air bags 12 (12a and 12b) located at the lower side are contracted, a lumbar support shape is formed with a bulging upper portion in which the upper waist portion air bag 12c is located.

In the seat device 30 according to the embodiment, during the support shape adjustment operation, the occupant determines the front-rear position of the lumbar support shape, that is, the protrusion amount X of the bulging shape 20 formed on the waist portion of the backrest face 3s, so that the internal pressure target value of the air bag 12 corresponding to the formation position of the bulging shape 20 among the air bags 12 (12a to 12c) is set. The operation of determining the protrusion amount X is performed while the occupant performs so-called "long pressing" on a front-rear position setting portion 55a of the operation switch 55 (see FIG. 3). Accordingly, the control device 50 according to the embodiment is configured to control the internal pressure P of the air bag 12 forming the bulging shape 20 based on the set internal pressure target value (waist portion expansion air bag internal pressure target value) Px.

In relation to each of the air bags 12 (12a to 12c) for lumbar support, which are provided to be aligned in the vertical direction so as to follow the backrest face 3s constituting the seat surface 1s, the control device 50 according to the embodiment moves the position of the bulging shape 20 formed by each corresponding air bag 12 in the vertical direction by sequentially expanding and contracting the air bags 12 along the arrangement direction the air bags 12.

For example, in the case where the bulging shape 20 is formed at the lower portion in the waist portion of the seat back 3, when the bulging shape 20 is moved upwards, the control device 50 according to the embodiment contracts the lower waist portion air bag 12a in the expanded state, and expands the middle waist portion air bag 12b located thereabove. The control device 50 contracts the middle waist portion air bag 12b in the expanded state, and expands the upper waist portion air bag 12c located thereabove. Accordingly, in the seat device 30 according to the embodiment, the bulging shape 20 determining the lumbar support shape moves from the lower portion to the upper portion in the waist portion of the seat back 3.

The operation of moving the bulging shape 20 determining the lumbar support shape in the seat device 30 according to the embodiment is performed while the occupant performs a long-press operation on a vertical position adjusting portion 55b of the operation switch 55 (see FIG. 3). Then, in the seat device 30 according to the embodiment, when the long-press operation by the occupant is terminated, the movement of the bulging shape 20 is stopped.

More specifically, as illustrated in FIG. 3, in the seat device 30 according to the embodiment, in branch lines L1' of the flow path L communicating with the air bags 12 (12a to 12c) for lumbar support, exhaust valves 44 dedicated to the air bags 12 are respectively provided at the downstream positions of the intake valves 42. Then, when the bulging shape 20 formed by each air bag 12 for lumbar support on the waist portion of the backrest face 3s is moved in the vertical direction, the control device 50 according to the embodiment uses the exhaust valves 44 to overlap a step of contracting the expanded air bag 12, and a step of expanding the air bag 12 arranged adjacent to the expanded air bag 12.

Figure 5A:
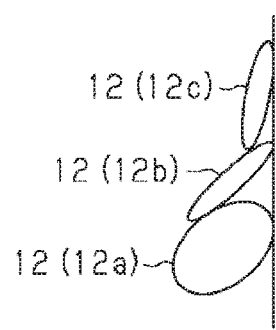
FIGS. 5A to 5F are explanatory views each illustrating an exemplary control of moving a position of a bulging shape formed on the backrest face by each corresponding air bag by sequentially expanding and contracting the air bags for lumbar support in an arrangement direction of the air bags.
Figure 5B:
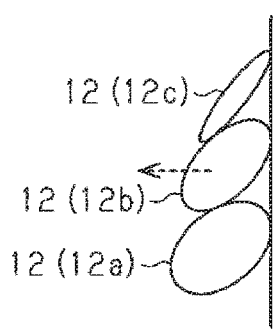
Figure 5C:
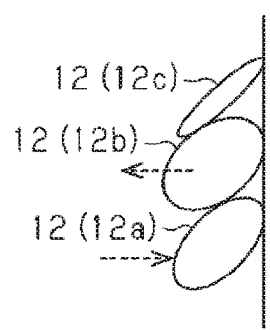
Figure 5D:
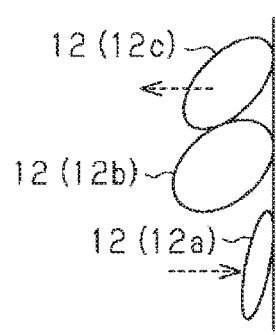
Figure 5E:
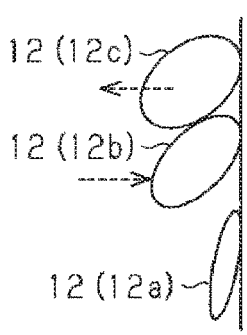
Figure 5F:
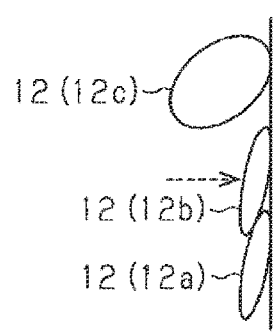

For example, when the bulging shape 20 formed on the backrest face 3s is moved upwards in the case where the lower waist portion air bag 12a is in the expanded state as illustrated in FIG. 5A, first, the control device 50 according to the embodiment expands the middle waist portion air bag 12b located above the air bag 12a as illustrated in FIG. 5B. In addition, as illustrated in FIG. 5C, while the middle waist portion air bag 12b is expanded, the control device 50 subsequently contracts the lower waist portion air bag 12a. As illustrated in FIG. 5D, in the case where the middle waist portion air bag 12b is in the expanded state, the control device 50 according to the embodiment expands the upper waist portion air bag 12c located above the air bag 12b. Then, as illustrated in FIG. 5E, while the upper waist portion air bag 12c is expanded, the control device 50 contracts the middle waist portion air bag 12b. Accordingly, the control device 50 according to the embodiment is configured to control the operations of the air pump 31 and the valve devices 40 constituting the intake/exhaust device 51 such that the upper waist portion air bag 12c is in the expanded state, and the two air bags 12 (12a and 12b) located below the air bag 12c are in the contracted state as illustrated in FIG. 5F.

Figure 6:
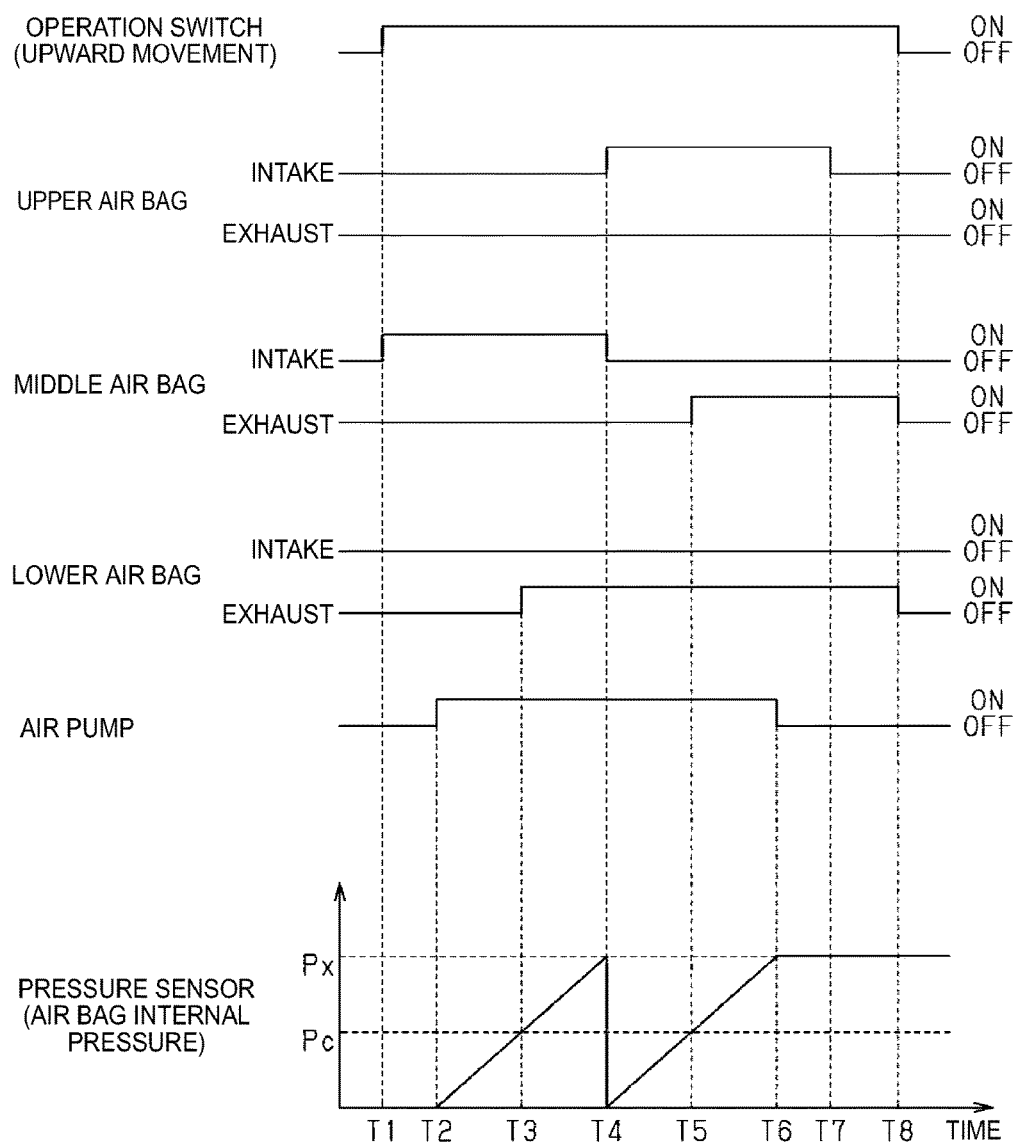
FIG. 6 is a time chart of a control of moving a position of a bulging shape formed on the backrest face by each corresponding air bag by sequentially expanding and contracting the air bags for lumbar support in an arrangement direction of the air bags.

Specifically, as illustrated in FIG. 6, when each air bag 12 for lumbar support forms the bulging shape 20 at the lower portion in the waist portion of the seat back 3, the control device 50 according to the embodiment opens the intake valve 42 corresponding to the middle waist portion air bag 12b simultaneously with the occurrence of the operation input requesting the upward movement of the bulging shape 20 (time T1: operation switch ON). Then, the control device 50 pumps air into the middle waist portion air bag 12b by initiating the driving of the air pump 31, thereby expanding the middle waist portion air bag 12b (time T2).

Next, at the timing when the internal pressure P of the middle waist portion air bag 12b that is expanding reaches a predetermined switching pressure Pc, the control device 50 according to the embodiment opens the exhaust valve 44 corresponding to the lower waist portion air bag 12a that has already been in the expanded state to discharge the internal air of the lower waist portion air bag 12a (time T3). In the embodiment, the switching pressure Pc is set to be "½" of the internal pressure target value Px (Pc=Px×0.5) set for each air bag 12 for lumbar support. At the timing when the internal pressure P of the middle waist portion air bag 12b reaches the set internal pressure target value Px, the control device 50 closes the intake valve 42 corresponding to the middle waist portion air bag 12b, thereby maintaining the middle waist portion air bag 12b in the expanded state (time T4).

In addition, the control device 50 according to the embodiment opens the intake valve 42 corresponding to the upper waist portion air bag 12c at the same timing as the closing of the intake valve 42 corresponding to the middle waist portion air bag 12b, thereby initiating the filling of air into the upper waist portion air bag 12c (time T4). At the timing when the internal pressure P of the upper waist portion air bag 12c that is expanding reaches the predetermined switching pressure Pc, the control device 50 opens the exhaust valve 44 corresponding to the middle waist portion air bag 12b that has already been in the expanded state to discharge the internal air of the middle waist portion air bag 12b (time T5).

At the timing when the internal pressure P of the upper waist portion air bag 12c reaches the set internal pressure target value Px, the control device 50 according to the embodiment stops the driving of the air pump 31 (time T6), and then closes the intake valve 42 corresponding to the upper waist portion air bag 12c, thereby maintaining the upper waist portion air bag 12c in the expanded state (time T7). At the timing when the operation input requesting the upward movement of the bulging shape 20 by the occupant is interrupted, the exhaust valves 44 corresponding to the lower waist portion air bag 12a and the middle waist portion air bag 12b are closed (time T8: operation switch OFF).

As described above, the seat device 30 according to the embodiment has a configuration in which the air bags 12 for lumbar support are sequentially expanded and contracted at overlapping timings so that the bulging shape 20 formed on the backrest face 3s is continuously moved in the vertical direction. Accordingly, it is possible to improve the feeling of use of the occupant seated on the seat 1.

As illustrated in FIG. 3, as the air pump 31 according to the embodiment, an electric pump using a motor 60 as a driving source is used. That is, the control device 50 according to the embodiment controls the operation of the air pump 31 through the supply of driving power based on a power supply voltage Vb of an in-vehicle power supply (battery) 61. Specifically, the control device 50 according to the embodiment duty-controls the motor 60 of the air pump 31 by executing the PWM control. Accordingly, it is possible to freely control the pumping capacity of the air pump 31.

More specifically, when the bulging shape 20 is moved in the vertical direction as described above by the sequential expansion/contraction of the air bags 12 along the arrangement direction of the air bags 12, the control device 50 according to the embodiment increases the pumping capacity of the air pump 31 as the protrusion amount X of the corresponding bulging shape 20 increases.

Figure 7:
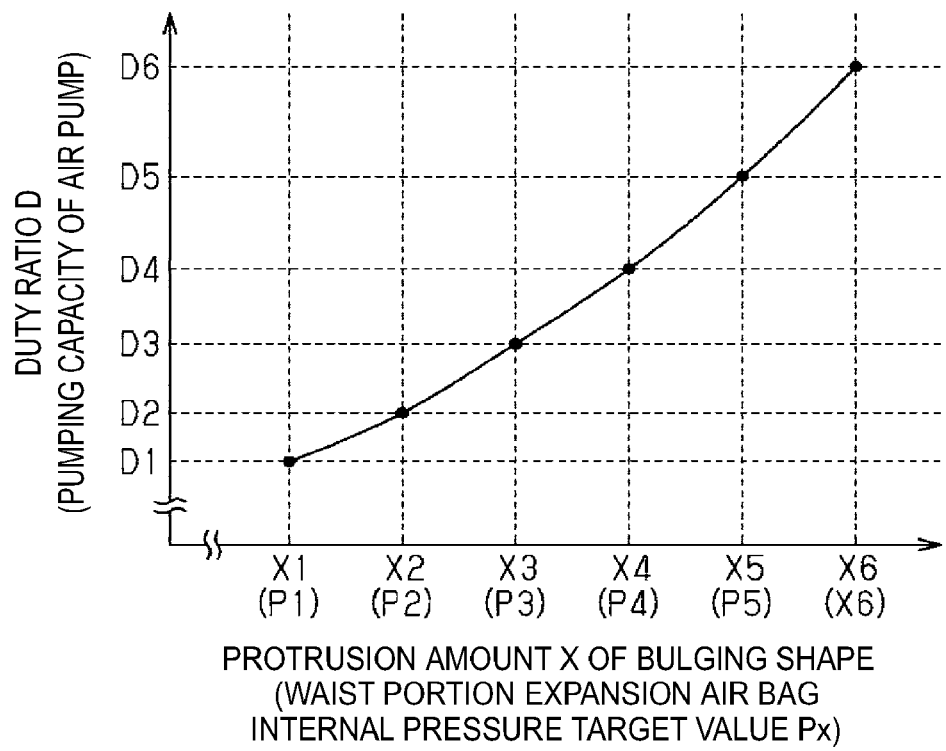
FIG. 7 is an explanatory view of a control of increasing a pumping capacity of an air pump according to a protrusion amount of a bulging shape when the formation position of the corresponding bulging shape is moved.

Specifically, as illustrated in FIG. 7, the control device 50 according to the embodiment recognizes the protrusion amount X of the bulging shape 20 formed by each air bag 12 on the backrest face 3s (the seat surface 1s) based on the internal pressure target value Px at the time of expansion set for each air bag 12 for lumbar support. As the internal pressure target value Px at the time of expansion set for each air bag 12 increases, the duty ratio D of the motor 60 as a driving source increases for the air pump 31.

More specifically, in the seat device 30 according to the embodiment, a plurality of step values X1 to X6 are set for the protrusion amount X of the bulging shape 20 formed by each air bag 12 for lumbar support on the backrest face 3s of the seat back 3, that is, for the front-rear position of the lumbar support shape adjustable by the occupant of the seat 1. Regarding the internal pressure target value Px at the time of expansion of each air bag 12 for lumbar support, the control device 50 according to the embodiment holds a plurality of pressure values P1 to P6 corresponding to the step values X1 to X6 in relation to the protrusion amounts X of the bulging shape 20, in the storage area 50a.

That is, in the seat device 30 according to the embodiment, when the internal pressure target value Px at the time of expansion of the air bag 12 for lumbar support is the second pressure value P2, the protrusion amount X of the bulging shape 20 in a state where the internal pressure P of the expanded air bag 12 reaches the second pressure value P2, that is, the air bag 12 is completely expanded becomes the second step value X2 corresponding to the second pressure value P2.

The control device 50 according to the embodiment holds a plurality of duty ratios D1 to D6 set to correspond to the pressure values P1 to P6 regarding the internal pressure target value Px at the time of expansion of each air bag 12 for lumbar support, in the storage area 50a. By plotting the pressure values P1 to P6 regarding the internal pressure target value Px and the duty ratios D1 to D6 in an orthogonal coordinate system, and performing linear interpolation, a control map of the duty ratio D based on the internal pressure target value Px at the time of expansion of each air bag 12 is formed as illustrated in FIG. 7.

Specifically, the duty ratios D1 to D6 held by the control device 50 according to the embodiment are set as values capable of adjusting the pumping capacity of the air pump 31 such that the moving speed of the bulging shape 20 becomes constant without depending on the protrusion amount X (the step values X1 to X6) of the bulging shape 20 formed by each air bag 12 for lumbar support on the backrest face 3s of the seat back 3. Accordingly, the seat device 30 according to the embodiment is configured to more stably move the position of the bulging shape 20 formed by each air bag 12 for lumbar support in the vertical direction.

Figure 8:
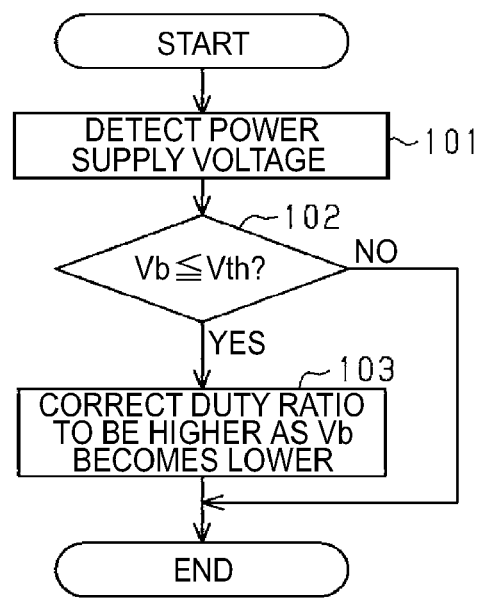
FIG. 8 is a flow chart illustrating an aspect of a control of adjusting a motor duty ratio according to a decrease of a power supply voltage.

As illustrated in the flow chart of FIG. 8, the control device 50 according to the embodiment detects the power supply voltage Vb of the in-vehicle power supply 61 (step 101), and determines whether the detected power supply voltage Vb is equal to or lower than a predetermined threshold value Vth (step 102). When it is determined that the detected power supply voltage Vb is equal to or lower than the predetermined threshold value Vth (step 102: YES), the duty ratio D of the motor 60 is corrected in accordance with the decrease of the power supply voltage Vb, that is, the duty ratio D is corrected to be higher as the detected power supply voltage Vb becomes lower (step 103).

As described above, according to the embodiment, the following effects may be achieved.

(1) The control device 50 serving as a bulging shape forming unit controls the operations of the air pump 31 and the valve devices 40 constituting the intake/exhaust device 51 so that the air bag 10 provided inside the seat 1 is expanded to form the bulging shape 20 on the seat surface 1s. The control device 50 serving as a bulging shape moving unit moves, in the vertical direction, the position of the bulging shape 20 formed by each corresponding air bag 12 on the seat surface 1s by sequentially expanding and contracting the air bags 12 for lumbar support aligned in the direction along the backrest face 3s of the seat back 3, in the arrangement direction of the air bags 10. The control device 50 serving as a pumping capacity adjusting unit increases the pumping capacity of the air pump 31 as the protrusion amount X of the corresponding bulging shape 20 increases when the formation position of the bulging shape 20 is moved.

According to the above configuration, when the position of the bulging shape 20 formed by each corresponding air bag 12 on the seat surface 1s (the backrest face 3s) is moved by the sequential expansion/contraction of the air bags 12 along the arrangement direction of the air bags 12, it is possible to quickly expand the air bag 12 even in the case where the protrusion amount X of the bulging shape 20 is large and the amount of air required for expanding the contracted air bag 12 is large. Accordingly, it is possible to more stably move the position of the bulging shape 20 formed by each air bag 12 on the seat surface 1s, in the vertical direction.

(2) The control device 50 adjusts the pumping capacity of the air pump 31 such that the moving speed becomes constant when the formation position of the corresponding bulging shape 20 is moved without depending on the protrusion amount X of the bulging shape 20. Accordingly, it is possible to more stably move the formation position of the bulging shape 20.

(3) The control device 50 pumps air into each air bag 12 by setting the internal pressure target value Px according to the protrusion amount X of the bulging shape 20. The control device 50 increases the pumping capacity of the air pump 31 as the internal pressure target value Px increases. Accordingly, it is possible to more exactly adjust the pumping capacity of the air pump 31 according to the protrusion amount X of the bulging shape 20 formed by each air bag 12 on the seat surface 1s.

(4) The control device 50 duty-controls the motor 60 of the air pump 31. When the position of the bulging shape 20 formed on the seat surface 1s is moved, the duty ratio of the motor 60 is increased as the protrusion amount X of the bulging shape 20 increases. Accordingly, it is possible to accurately adjust the pumping capacity of the air pump 31 according to the protrusion amount X of the bulging shape 20 formed by each air bag 12 on the seat surface 1s.

(5) The control device 50 serving as a voltage compensation unit monitors the power supply voltage Vb of the motor 60. As the power supply voltage Vb is decreased, the duty ratio D of the motor 60 is increased. Accordingly, even when the power supply voltage Vb of the motor 60 is lowered, the formation position of the bulging shape 20 may be stably moved.

The embodiment may be modified as follows.

In the embodiment, as the air bags 12 for lumbar support, the lower waist portion air bag 12a, the middle waist portion air bag 12b, and the upper waist portion air bag 12c are provided to be aligned in the vertical direction of the seat back 3. However, this disclosure is not limited thereto. The number of the air bags 12 may be two or four or more.

In the embodiment, at a position corresponding to the waist portion (lumbar) of the occupant seated on the seat 1, when the bulging shape 20 formed on the backrest face 3s by each of the air bags 12 (12a to 12c) for lumbar support provided inside the seat back 3 is moved in the vertical direction, the pumping capacity of the air pump 31 is adjusted according to the protrusion amount X of the corresponding bulging shape 20.

However, this disclosure is not limited thereto. As long as the position of the bulging shape formed by each corresponding air bag 10 on the seat surface 1s is moved by sequentially expanding and contracting the plurality of air bags 10 aligned in the direction along the seat surface 1s, in the arrangement direction of the air bags 10, each of the air bags 10 for which the pumping capacity of the air pump 31 is adjusted according to the protrusion amount X of the bulging shape 20 does not have to be for lumbar support. For example, the configuration of adjusting the pumping capacity of the air pump 31 according to the protrusion amount X of the bulging shape 20 in relation to the plurality of air bags 10 arranged side by side may be applied to a bulging shape 20 formed in a portion other than the waist portion in the backrest face 3s, or a bulging shape 20 formed in the seating surface 2s of the seat cushion 2. Also, the arrangement direction of the air bags 10, which corresponds to a movement direction of the bulging shape 20, may be a front-rear direction of the seat, or a seat width direction. Without being limited to the air bags 10 for seat support, another configuration may be employed in which the pumping capacity of the air pump 31 may be adjusted according to the protrusion amount of the bulging shape when a bulging shape, which is formed on the seat surface 1s by each of air bags for massaging (refreshing) aligned in the direction along the seat surface 1s, is moved.

In the embodiment, when the air bags 12 are sequentially expanded and contracted in the arrangement direction of the air bags 12 so that the bulging shape 20 formed by each air bag 12 on the backrest face 3s is moved in the vertical direction, a step of contracting an expanded air bag 12, and a step of expanding an air bag 12 arranged adjacent to the expanded air bag 12 overlap each other. However, this disclosure is not limited thereto. A configuration may be employed in which a step of contracting an expanded air bag 12 and then expanding an air bag 12 arranged adjacent to the contracted air bag 12 may be repeated so as to sequentially expand and contract the air bags 12 aligned in the direction along the seat surface 1s.

In the embodiment, the predetermined switching pressure Pc set to correspond to a timing when the exhaust valve 44 corresponding to the air bag 12 that has already been in an expanded state is opened is set to be "½" of the internal pressure target value Px (Pc=Px×0.5) at the time of expansion of each air bag 12. However, the switching pressure Pc may be arbitrarily changed.

In the embodiment, an electric pump using the motor 60 as a driving source is used as the air pump 31. The control device 50 duty-controls the motor 60, thereby adjusting the pumping capacity of the air pump 31. However, this disclosure is not limited thereto. The air pump 31 may not necessarily be an electric pump. Also, the adjustment of the pumping capacity of the air pump 31 may be performed using for example, a pressure control valve, a flow rate control valve, and the like without being limited to the duty-control of the motor 60.

In the embodiment, the pumping capacity of the air pump 31 increases as the internal pressure target value Px at the time of expansion set for each air bag 12 increases. However, this disclosure is not limited thereto. The pumping capacity of the air pump 31 may be adjusted based on the step values X1 to X6 of the protrusion amount X set when the occupant presses, for example, the front-rear position setting portion 55a of the operation switch 55 for a long time.

The number and arrangement of the air bags 10 provided inside the seat 1 may be arbitrarily changed. The numbers, arrangements, and types of the air pump 31 and the valve device may be arbitrarily changed.

In the above described embodiment and other examples, the control device 50 controls the operations of the air pump 31 and the valve devices 40 so as to constitute the bulging shape forming unit, the bulging shape moving unit, the pumping capacity adjusting unit, and the voltage compensation unit. However, this disclosure is not limited thereto. The respective functional control units may be constituted by a plurality of control devices.

Hereinafter, technical ideas that may be grasped from the above embodiment will be described together with the effects.

It is preferable that an air pressure control device of a vehicle seat according to an aspect of this disclosure includes: a bulging shape forming unit configured to form a bulging shape on a seat surface by expanding air bags configured to be provided inside a seat; a bulging shape moving unit configured to move a position of the bulging shape formed on the seat surface by each corresponding air bag by sequentially expanding and contracting a plurality of air bags aligned in a direction along the seat surface in an arrangement direction of the air bags; and a pumping capacity adjusting unit configured to increase a pumping capacity of an air pump that pumps air into each air bag as a protrusion amount of the corresponding bulging shape increases when a formation position of the bulging shape is moved.

According to this configuration, when the position of the bulging shape formed by each corresponding air bag on the seat surface is moved by the sequential expansion/contraction of the air bags along the arrangement direction of the air bags, it is possible to quickly expand the air bag even in the case where the protrusion amount of the bulging shape is large, and the amount of air required for expanding the contracted air bag is large. Accordingly, it is possible to more stably move the position of the bulging shape formed by each air bag on the seat surface.

In the air pressure control device of the vehicle seat, it is preferable that the pumping capacity adjusting unit adjusts the pumping capacity of the air pump such that a moving speed becomes constant when the formation position of the corresponding bulging shape is moved without depending on the protrusion amount of the bulging shape.

According to this configuration, it is possible to more stably move the formation position of the bulging shape.

In the air pressure control device of the vehicle seat, it is preferable that the bulging shape moving unit sets an internal pressure target value of the air bag according to the protrusion amount of the bulging shape and pumps the air into each air bag, and the pumping capacity adjusting unit increases the pumping capacity of the air pump as the internal pressure target value increases.

According to this configuration, it is possible to more exactly adjust the pumping capacity of the air pump according to the protrusion amount of the bulging shape formed by each air bag on the seat surface.

In the air pressure control device of the vehicle seat, it is preferable that the pumping capacity adjusting unit duty-controls a motor serving as a driving source of the air pump, and increases a duty ratio of the motor as the protrusion amount of the bulging shape increases.

According to this configuration, it is possible to accurately adjust the pumping capacity of the air pump according to the protrusion amount of the bulging shape formed by each air bag on the seat surface.

It is preferable that the air pressure control device of the vehicle seat further includes a voltage compensation unit that monitors a power supply voltage of the motor, and increases the duty ratio according to a decrease of the corresponding power supply voltage.

Accordingly, it is possible to stably move the formation position of the bulging shape even if the power supply voltage of the motor is decreased.

It is preferable that a method of controlling an air pressure of a vehicle seat according to another aspect of this disclosure includes: forming a bulging shape on a seat surface by expanding air bags configured to be provided inside a seat; moving a position of the bulging shape formed on the seat surface by each corresponding air bag by sequentially expanding and contracting a plurality of air bags aligned in a direction along the seat surface, in an arrangement direction of the air bags; and increasing a pumping capacity of an air pump that pumps air into each air bag as a protrusion amount of the corresponding bulging shape increases when a formation position of the bulging shape is moved.

According to the aspects of this disclosure, it is possible to more stably move the position of the bulging shape formed on the seat surface by the expanded air bag inside the seat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air pressure control device of a vehicle seat, the air pressure control device comprising:
   a bulging shape forming unit configured to form a bulging shape on a seat surface by expanding air bags configured to be provided inside a seat;
   a bulging shape moving unit configured to move a position of the bulging shape formed on the seat surface by each corresponding air bag by sequentially expanding and contracting a plurality of air bags aligned in a direction along the seat surface in an arrangement direction of the air bags; and
   a pumping capacity adjusting unit configured to increase a pumping capacity of an air pump that pumps air into each air bag in order to move a formation position of the bulging shape as a protrusion amount of the corresponding bulging shape increases.

2. The air pressure control device according to claim 1, wherein the pumping capacity adjusting unit adjusts the pumping capacity of the air pump such that a moving speed of the formation position of the corresponding bulging shape becomes constant without depending on the protrusion amount of the bulging shape.

3. The air pressure control device according to claim 1, wherein the bulging shape moving unit sets an internal pressure target value of the air bag according to the protrusion amount of the bulging shape and pumps the air into each air bag, and
the pumping capacity adjusting unit increases the pumping capacity of the air pump as the internal pressure target value increases.

4. The air pressure control device according to claim 1, wherein the pumping capacity adjusting unit duty-controls a motor serving as a driving source of the air pump, and increases a duty ratio of the motor as the protrusion amount of the bulging shape increases.

5. The air pressure control device according to claim 4, further comprising a voltage compensation unit that monitors a power supply voltage of the motor, and increases the duty ratio according to a decrease of the corresponding power supply voltage.

6. The air pressure control device according to claim 1, wherein the pumping capacity adjusting unit increases the pumping capacity of the air pump by a plurality of steps that correspond to the protrusion amount.

7. A method of controlling an air pressure of a vehicle seat, the method comprising:
   forming a bulging shape on a seat surface by expanding air bags configured to be provided inside a seat;
   moving a position of the bulging shape formed on the seat surface by each corresponding air bag by sequentially expanding and contracting a plurality of air bags aligned in a direction along the seat surface, in an arrangement direction of the air bags; and
   increasing a pumping capacity of an air pump that pumps air into each air bag in order to move a formation position of the bulging shape as a protrusion amount of the corresponding bulging shape increases.

* * * * *